Oct. 14, 1947.  V. N. ALBERTSON  2,428,924
COUNTERBALANCE MECHANISM
Filed July 24, 1944  2 Sheets-Sheet 1

Inventor
VICTOR N. ALBERTSON
By Carlsen + Hogle
Attorneys

Oct. 14, 1947.  V. N. ALBERTSON  2,428,924

COUNTERBALANCE MECHANISM

Filed July 24, 1944  2 Sheets-Sheet 2

Inventor.
VICTOR N. ALBERTSON

By Carlsen + Hazle
Attorneys

Patented Oct. 14, 1947

2,428,924

UNITED STATES PATENT OFFICE 2,428,924

COUNTERBALANCE MECHANISM

Victor N. Albertson, Minneapolis, Minn., assignor to Minneapolis-Moline Power Implement Company, Minneapolis, Minn., a corporation of Delaware Application July 24, 1944, Serial No. 546,369

2 Claims. (Cl. 74—604)

This invention relates generally to a counterbalance mechanism and more particularly to a counterbalanced translating means, for translating rotary motion to reciprocating motion.

The primary object of the invention is to provide means whereby the shocks incidental to the reciprocating member reaching the ends of its stroke are opposed and canceled out by counterbalance weights operating about the rotary axis of the crank driving said reciprocating member. Another object is to provide a mechanism of this nature embodying a pair of counterbalance weights rotated in opposite directions about the axis of the crank, and so timed with respect to the rotation of said crank that the two weights will move into coincidence at opposite sides of the axis to exert a centrifugal force thereon at exactly the proper times and proper directions for opposing the pull effective against the axis exerted by the reciprocating member connected to the crank, as it reaches the end of its stroke.

These and other more detailed and specific objects will be disclosed in the course of the following specification, reference being had to the accompanying drawing, in which—

Figures 1, 2:
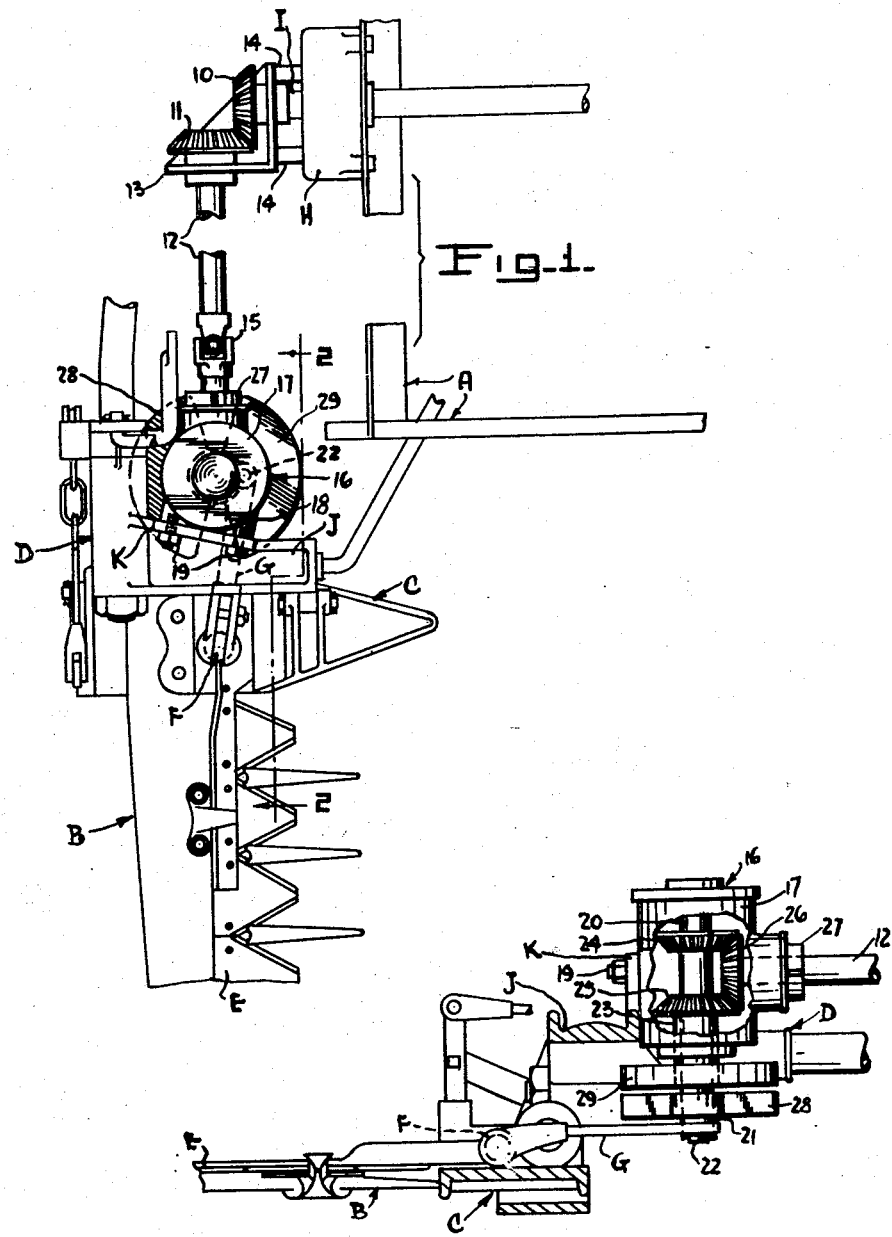
Fig. 1 is a fragmentary plan view illustrating the application of my counterbalancing mechanism in connection with a mower.
Fig. 2 is a vertical sectional view along the line 2—2 in Fig. 1, and with parts of said counterbalancing mechanism broken away to disclose interior construction.

In the drawing, Figs. 1 and 2, I have illustrated my invention as applied to a conventional power mower of the type which is disclosed in detail in Reissue Patent 21,819, reissued on June 3, 1944, to Alfred Korsmo and Martin Ronning. This illustration is for example only and it is to be understood that I do not limit the application of my invention to mowers, but may use it in any case where mechanism for translating rotary motion to reciprocating motion is required.

As here shown, the mower comprises a frame A from which is laterally supported a sickle mechanism B, at its inner end connected to a shoe C and to an auxiliary frame, designated generally at D. The sickle mechanism B includes a sickle bar E, one end of which is provided with a ball F to which the pitman G is usually connected for rapidly reciprocating the bar. Ordinarily the pitman G is operated by drive mechanism, designated generally at H, and which includes a driven shaft I upon which an eccentric (not here shown) was mounted in the patent structure hereinbefore identified, for actuating the pitman. The auxiliary frame D includes a casting J, having on its inner side an upright flange K.

In accordance with my invention I substitute for the usual long pitman the short pitman, indicated at G, which extends beneath the casting J and terminates at its inner end immediately inward of the vertical plane of the aforesaid flange K. I also substitute for the eccentric upon the shaft I a bevel gear 10 which meshes with and operates another gear 11 upon the end of a shaft 12, which shaft extends toward the said casting J. The gears 10 and 11 are journaled upon a suitable bracket mechanism 13 secured, as indicated at 14, to the drive mechanism H. The shaft 12 may be provided with a conventional universal joint, as indicated at 15 in Fig. 1.

Connecting the shaft 12 and the short pitman G is my improved counterbalance mechanism and motion translating means, which is indicated generally at 16. As here shown, this mechanism 16 includes a housing 17 formed along one side with a flat mounting boss 18 which is disposed against the flange K of the casting J and secured thereto by means of the stud bolts 19. The housing 17 is thus supported above the inner end of the pitman G, and journaled vertically through the housing is a shaft 20 which depends well below the housing and is provided at its lower end with a hub 21 upon which is an eccentric pin 22 forming a crank connection to the inner end of the pitman G. Surrounding a portion of the shaft 20 is a tubular shaft 23 also journaled through the lower end of the housing 17, and this tubular shaft terminates immediately below the end of the housing, as seen in Fig. 2. Inside the housing the shafts 20 and 23 are provided with opposed beveled gears 24 and 25 secured to the respective shafts and spaced apart to receive therebetween a bevel drive pinion 26. This drive pinion 26 is secured to the end of the shaft 12 which is journaled through the adjacent sides of the housing 17, as shown at 27. Obviously this arrangement of the gears will cause the shaft 12, which is rotated in one direction by the drive mechanism H, to rotate the shafts 20 and 23 in opposite directions. The rotation of the shaft 20 is effective through crank connection formed by the eccentric pin 22 to reciprocate the pitman G and attached sickle bar E, translating this rotary motion to the required reciprocating motion.

Secured to the lower end of the shaft 20 is a sector-shaped counterbalancing weight or member 28 disposed on the opposite side of the axis of the shaft from the eccentric pin 22. A similarly shaped counterbalancing weight or member 29 is secured to the lower end of the tubular shaft 23 and is spaced above the weight 28 to clear the same in operation. Obviously, due to the opposite rotation of the shafts 20 and 23, the weights 28 and 29 will be rotated about in opposite directions during operation of the mechanism and will, at two diametrically opposed points with respect to the axes of the shafts, come into registry or alignment with each other so that they assume momentarily exactly the same position and on the same sides of the axes of these shafts.

Figure 3:
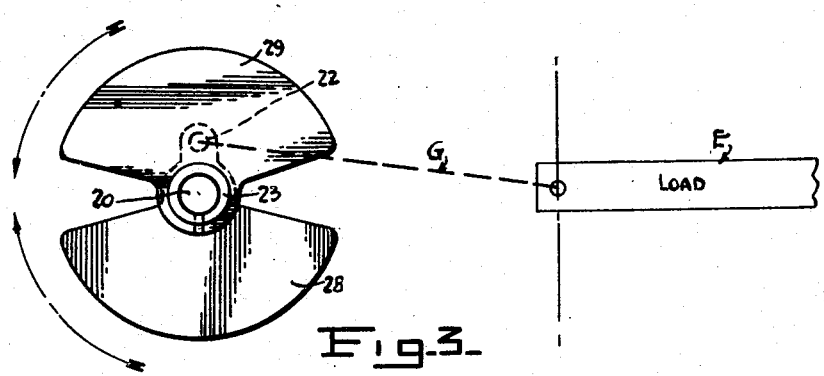
Figs. 3, 4 and 5 are diagrammatical views illustrating progressive stages in the counterbalancing action of my mechanism.
Figure 4:
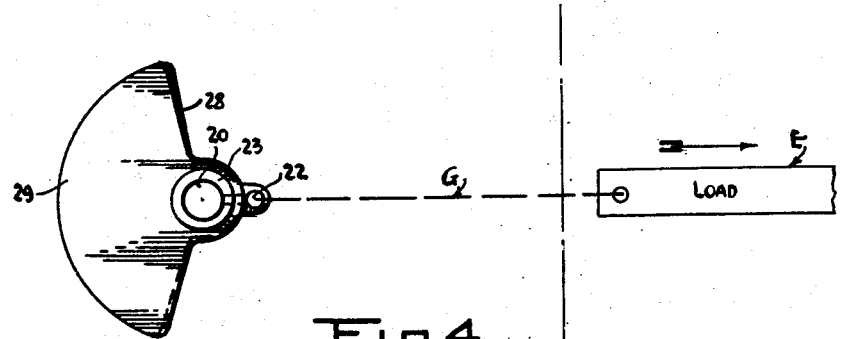
Figure 5:
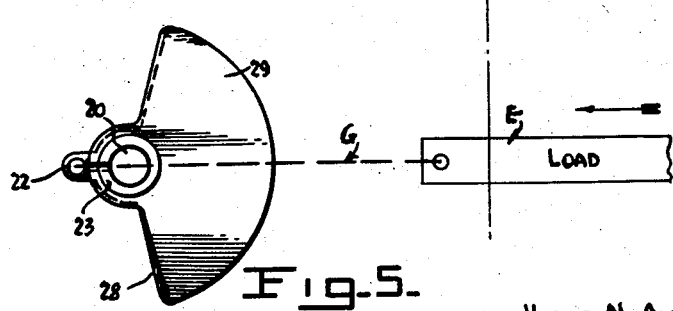

Referring now more particularly to Figs. 3 through 5, it will be observed that I have indicated therein the shafts 20 and 23, the eccentric pin 22, pitman G, and a load which in the present instance is the sickle bar E, and is so designated. The counterbalancing weights 28 and 29 are also indicated. The rotation of the weights is so timed that when the load E is in a position intermediate the extremity of its stroke the weights 28 and 29 will oppose each other, or be located on exactly opposite sides of the axes of the shafts 20 and 23 or of the crank axis as it will be hereinafter called. This condition is illustrated in Fig. 3. Now as the load E moves to the right, as viewed in Fig. 4, and completes its stroke in that direction, the eccentric pin 22 will move through an arc of 90 degrees and the weights 28 and 29, moving through corresponding arcs but in opposite directions, are caused to move to the same side of the crank axis and to the side opposite that of the eccentric pin 22. It will be apparent then that the centrifugal force exerted by these weights will be applied to the crank axis in a direction exactly opposing the pull on this axis occasioned by the load E reaching the end of its stroke and reversing its direction of travel. Thus the shock and strain upon the shafts 20 and 23, and the mechanism as a whole, will largely be opposed and canceled out. As seen in Fig. 5, the same condition occurs as the load E moves to the left or to the extreme of its stroke in the opposite direction. The eccentric pin 22 is now disposed on the opposite side of the crank axis, having moved through an arc of 180 degrees of the position illustrated in Fig. 4. At this time then the weights 28 and 29 have traveled similar arcs and have reached a point at which their centrifugal force is exerted on the side of the crank axis exactly opposing the thrust of the load upon the shafts.

It will be apparent from the foregoing, that I have provided means whereby oppositely rotatable counterbalancing weights are arranged to exert centrifugal forces upon the rotary axis or crank axis, of a motion translating mechanism, at two points or times, which points exactly oppose the opposite load forces exerted upon the crank axis as the reciprocating member reaches the ends of its stroke and reverses its direction of motion. I thus make it possible to cancel the reaction between a rotary crank and reciprocating load connected thereto and to reduce wear on the parts, and the shocks and strains usually incident to the operation of mechanisms of this kind.

It will be apparent that, if required, the relative actual weights of the counterbalancing weights 28 and 29 may be individually adjusted and balanced as required by boring suitable holes (not shown) through the weights in the conventional manner.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. Mechanism for translating rotary motion from a drive member to reciprocating motion of a driven member comprising, a pair of coaxial gears mounted for rotation in opposite directions about a stationary axis, an axially stationary gear driven by the drive member and meshing with the coaxial gears to drive them in opposite directions of rotation, a pair of eccentrically acting weights disposed at one side with respect to the coaxial gears, a shaft connecting one of the coaxial gears to one of the weights, a sleeve about said shaft connecting the other coaxial gear to the other weight, and a drive connection between said shaft and the driven member.

2. Mechanism for translating rotary motion from a drive member to reciprocating motion of a driven member comprising a casing, a pair of coaxial gears mounted within the casing for rotation in opposite directions, a third gear meshing with said coaxial gears for driving them from the drive member, a shaft extending from one of the coaxial gears and through the other coaxial gear to the exterior of the casing, a sleeve extending from said other coaxial gear about said shaft and to the exterior of the casing, eccentrically acting counterweights attached to the respective outer ends of the shaft and sleeve, and a drive connection between said shaft and the driven member.

VICTOR N. ALBERTSON.

REFERENCES CITED

The following references are of record in the file of this patent:

UNITED STATES PATENTS

| Number | Name | Date |
|---|---|---|
| 642,761 | Smith | Feb. 6, 1900 |
| 672,320 | Ford | Apr. 16, 1901 |
| 1,027,775 | Schubert | May 28, 1912 |
| 1,756,915 | Short | Apr. 29, 1930 |
| 1,779,923 | Wagner | Oct. 28, 1930 |
| 1,827,586 | Keefer | Oct. 13, 1931 |
| 1,969,500 | Buckwalter | Aug. 7, 1934 |
| 2,248,182 | Mateer | July 8, 1941 |
| 2,345,383 | Curtis | Mar. 28, 1944 |

FOREIGN PATENTS

| Number | Country | Date |
|---|---|---|
| 19,232 | Great Britain | Aug. 31, 1896 |